United States Patent [19]

Shimoda et al.

[11] 3,709,971
[45] Jan. 9, 1973

[54] METHOD AND APPARATUS FOR PRODUCING MULTI-LAMINATED FIBERS

[75] Inventors: Keitaro Shimoda; Nobuhiro Tsutsui; Keiichi Zoda; Masayuki Ueki, both of 1900 Kanaoka Saidaiji, all of Okayama, Japan

[73] Assignee: Japan Exlan Company Limited

[22] Filed: May 13, 1970

[21] Appl. No.: 36,805

[30] Foreign Application Priority Data

May 14, 1969 Japan .............................. 44/37494

[52] U.S. Cl. .................. 264/182, 264/171, 264/349, 425/198
[51] Int. Cl. ............................ B29b 1/04, B29f 3/10
[58] Field of Search .................... 264/171–174, 182, 264/349; 425/131, 133

[56] References Cited

UNITED STATES PATENTS

| | | |
|---|---|---|
| 3,531,368 | 9/1970 | Okamoto et al. ...................... 161/175 |
| 3,577,308 | 5/1971 | Van Drunen et al. ................. 264/147 |
| 3,038,240 | 6/1962 | Kovarik ................................ 264/171 |
| 3,182,106 | 5/1965 | Fujita et al. .......................... 264/171 |
| 3,344,472 | 10/1967 | Kitajima et al. ..................... 264/171 |
| 3,447,308 | 6/1969 | Fratijin et al. ....................... 264/171 |
| 3,469,279 | 9/1969 | Hudgell ............................... 264/171 |
| 3,546,328 | 12/1970 | Lodge et al. ......................... 264/171 |
| 3,006,028 | 10/1961 | Calhoun ............................... 18/85 C |

FOREIGN PATENTS OR APPLICATIONS

| | | |
|---|---|---|
| 1,058,448 | 2/1967 | Great Britain ....................... 264/171 |
| 44/890 | 1/1969 | Japan .................................. 264/171 |
| 6,803,669 | 9/1968 | Netherlands ........................ 161/177 |
| 760,179 | 10/1956 | Great Britain ....................... 264/171 |
| 43/524 | 1/1968 | Japan ............................ 264/DIG. 26 |
| 43/19604 | 8/1968 | Japan ............................ 264/DIG. 26 |
| 44/3505 | 2/1969 | Japan ............................ 264/DIG. 26 |

Primary Examiner—Jay H. Woo
Attorney—Wenderoth, Lind & Ponack

[57] ABSTRACT

This invention relates to a process and apparatus for producing new multi-laminated fibers in which at least two different kinds of fiber-forming components are mutually dispersed in the cross-section of the fiber.

8 Claims, 4 Drawing Figures

METHOD AND APPARATUS FOR PRODUCING MULTI-LAMINATED FIBERS

This invention relates to a process and apparatus for producing new multi-laminated fibers in which at least two different kinds of fiber-forming components are mutually dispersed in the cross-section of the fiber.

Composite fibers made by bonding two or more kinds of fiber-forming components in a side-by-side or sheath-core relation have come to have their utility recognized by providing such characteristics never recognized in fibers consisting of a single component as the peculiar three-dimensional coil crimps based on the difference between the thermal shrinking behaviors of the fiber-forming components and the multi-color dyeability of the composite fiber-forming components. However, the combination of fiber-forming components that can be used in forming such composite fiber is naturally limited by various requirements, for example fiber properties such as tenacity and elongation, and the necessary thermal shrinking behavior difference. Therefore, the attempt to control crimp developability and to improve the physical properties of fibers by giving a complicated dispersion to the arrangement of fiber-forming components in the cross-section of the fiber has not been practiced, although there have been made some proposals in this direction. For example, in Japanese Pat. publication No. 9047/1965, there has been suggested a spinning method wherein a filler is packed in a conduit pipe for a spinning solution so that the spinning solution passing through the conduit pipe may collide with the filler particles. There has also been proposed in Japanese Pat. publication No. 3505/1969 a process for producing a fibrous substance in which two or more kinds of fiber-forming components are dispersed with each other by taking into consideration the relation between the minimum repeated length of the fiber-forming component flow and the diameter of the filler particles.

As a result of repeating precise experiments to improve the microstructural peculiarity of synthetic fibers, we have found that the dispersion-mixing action to be imparted to fiber-forming components, in extruding the spinning solution through a filler layer and orifices to form multi-laminated or composite fibers, does not depend merely on the minimum repeated length of the fiber forming component flow and the particle size or diameter of the filler as described above, but can be determined by quantitatively controlling the interrelations among a laminar flow region of the fiber-forming component flow, a dispersion region of said component flow and a delivery region of the dispersion-mixed fiber-forming component flow located below the dispersion region.

An object of the present invention is to provide new multi-laminated or composite fibers having a microstructural peculiarity in which at least two kinds of fiber-forming components are mutually dispersed in the cross-section of the fiber and along its axial direction.

Another object of the present invention is to provide a process and apparatus for producing multi-laminated fibers in which different kinds of fiber-forming components are dispersed with each other.

Such objects of the present invention are attained by flowing down at least two different kinds of fiber-forming components in the form of laminar flows through independent flow passages alternately arranged and isolated from each other and then leading them to spinning orifices through a dispersion region filled with a dispersion aid, provided below the above mentioned independent flow passages and having dimensional characteristics defined by the relative formula $$PDT^{-1} \le H \le 125 PDT^{-1} \qquad (1)$$

wherein $P$ is a center distance in mm. between adjacent independent flow passages through which different kinds of fiber-forming components are made to flow down in the form of laminar flows, $D$ is a typical dimension in mm. of a dispersing aid, $T$ is a thickness in mm. along the fiber spinning direction of the dispersion region and $H$ is a center distance in mm. between adjacent spinning orifices.

The invention will be further explained by referring to the accompanying drawings wherein.

Figure 2:
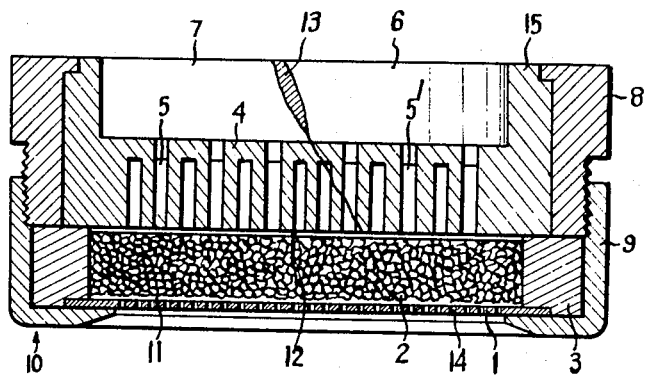
FIG. 2 is a vertical sectional view of an apparatus suitable for carrying out the method of this invention.
Figure 3:
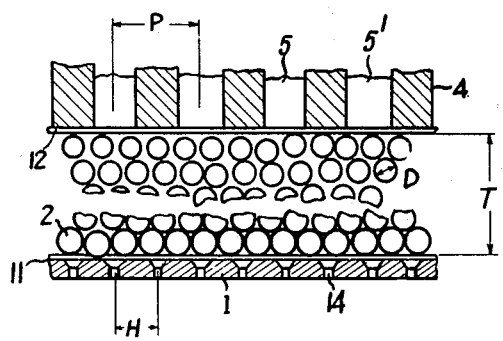
FIG. 3 is an enlarged view of an essential portion of the apparatus shown in FIG. 2.

Referring to the drawings, particularly FIGS. 2 and 3, a feeding head 15 fitted in an outer sleeve 8 has, in the lower part thereof, independent flow passages 5 and 5' respectively through which two different kinds of fiber-forming component flows are made to flow down in the form of laminar flows while being isolated from each other by partition walls 4. In the region above the said independent flow passages is provided a partition wall 13 to separate different kinds of fiber-forming component flows to be fed into chambers 6 and 7 so as not to mix with each other.

The fiber-forming component fed into the chamber 7 flows down through the independent flow passages 5, while the other fiber-forming component fed into the chamber 6 flows down through the independent flow passages 5' into a dispersion region located below the respective passages. A ring 3 is provided in contact with the lower surface of the feeding head 15. In the hollow part inside the ring 3 are fitted a screen 12, a layer of dispersing aid 2 and screen 11.

A spinnerette 1 provided with spinning orifices 14 is set with the back surface in contact with the above mentioned screen 11 and is secured with a fastener 9. Thus, the fastener 9 is engaged at the upper and inner peripheral side part with the outer sleeve 8 to form a spinnerette device 10 within which the feeding head 15, screen 12, dispersion layer 2, screen 11 and spinnerette 1 are unitarily set.

The dispersing aid 2 to be used in the present invention is a filler to give a required dispersing action to the two or more kinds of fiber-forming component flows flowing down therethrough from the independent flow passages 5 and 5'. It is not necessary to consider any specific direction of the dispersing aid particles in filling them in the hollow part inside the ring 3. Thus, it is possible to use steel balls, glass balls, metal screen pieces, metal pipes or porcelain pipes made uniform or different in the dimensions. A mixture of two or more of them may also be used. The typical dimension $D$ in mm. of the dispersing aid in the present invention means the diameter in case the dispersing aid is such solid spheres as fine grains or particles of stainless steel; the dimension of the length represented as average value of the outside diameter of the tube and the length along the axial direction of the peripheral side part when metal or porcelain pipes known as Rassing rings are used; and three times the diameter of the fine metal wire in case a dispersing aid made of metal screens and wall known as a Dickson packing or MacMahon packing is used or in case such fine metallic wires as single turn helix wires are used.

By the term "dispersion aid" or "dispersing aid" as used hereinafter and in the claims is meant such materials as are described above.

Figure 1:
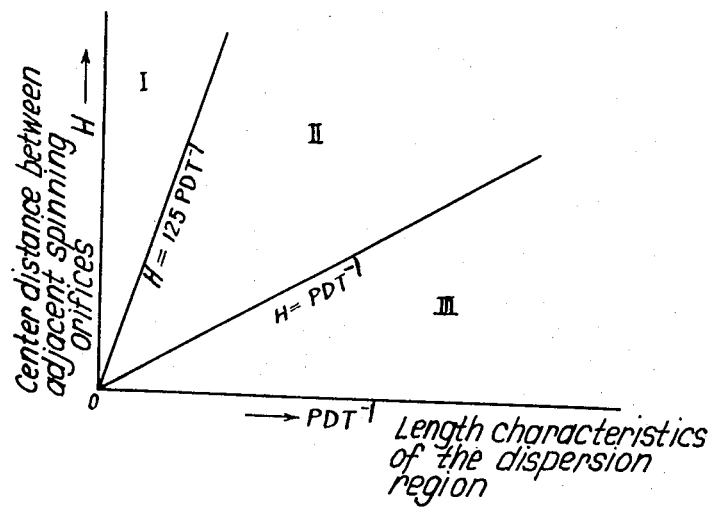
FIG. 1 is an orthogonal coordinate diagram showing the characteristics of a dispersion-mixed region.

In the present invention, the structural peculiarity of the multi-laminated fibers is not determined merely by the pitch of the independent flow passages and the diameter of the dispersing aid but also by adopting the dimensional characteristic of the passage of the fiber-forming component as defined by the above indicated relative formula (1). This relation is represented as a diagram in FIG. 1 in which the region II defined by the straight line of $H = 125 PDT^{-1}$ and the straight line of $H = PDT^{-1}$ is a region in which it is possible to form multi-laminated fibers in the present invention. In the diagram, the regions I and III are those in which it is impossible or remarkably difficult to give a mutual dispersion of fiber-forming components favorable to form desired multi-laminated fibers.

Figure 4:
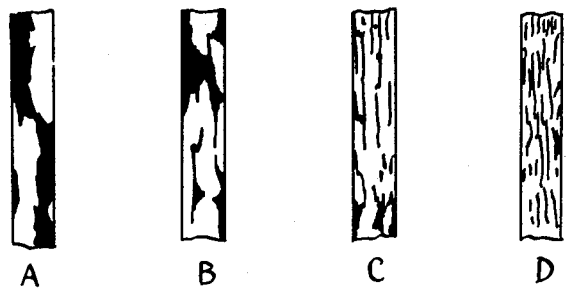
FIG. 4 A, B, C and D each shows a schematic longitudinal section of a fiber produced by this invention.

When the dispersion-mixed state of the fiber-forming components was investigated by maintaining the center distance $H$ between the spinning orifices constant and varying the range of $PDT^{-1}$ representing the length characteristics of the dispersion region of the fiber-forming components, it was confirmed that, in a range wherein $PDT^{-1}$ is large, the degree of dispersion of the fiber-forming components was comparatively low and distribution of the fiber-forming components in the resulting composite fibers was as shown in A of FIG. 4. On the other hand, in a range wherein $PDT^{-1}$ is comparatively small, even if the center distance $H$ between the spinning orifices is maintained constant, the dispersing action on the fiber-forming components increases remarkably and there is obtained a fiber structure in which the different kinds of components become intermittent with each other and disperse in the form of laminations or stripes as shown in D of FIG. 4. Further, when the relation between the center distance $H$ between the spinning orifices and the length characteristic value $PDT^{-1}$ of the dispersion region is properly varied within the range recommended in the present invention, it is possible to make a multi-laminated fiber exemplified in B or C of FIG. 4. According to the experiments made by us, it has been confirmed that, when the value of the above mentioned $PDT^{-1}$ is maintained substantially constant and the center distance $H$ between the adjacent spinning orifices is varied, the dispersion of the fiber-forming components is promoted with the increase of said center distance $H$.

On the other hand, in case a comparatively low dispersion is to be made under a spinning condition maintaining the length characteristic value $PDT^{-1}$ on the same level or, for example, in the case it is desired to impart a developability of three-dimensional coil crimps to obtained fibers, it is necessary to provide the center distance $H$ between the spinning orifices to be as small as possible. However, from the restriction in the final fineness of a multi-laminated fiber to be spun, the form peculiarity of the cross-section of the fiber or the fabrication work to make the spinnerette, the lower limit of the above mentioned center distance $H$ between the spinning orifices is naturally restricted. Thus, when these practical conditions are taken into consideration, the limit of the center distance between the spinning orifices will be about 300 $\mu$.

In case the spinning conditions deviate from the particular range recommended in the present invention, the effect of multi-lamination intended in this invention is not attained. For example, if the center distance H between the spinning orifices becomes larger than $H = 125 PDT^{-1}$, the degree of the dispersion of the fiber-forming components with each other becomes excessively large, the arrangement of the fiber-forming components in the resulting fiber would be close to that obtained by conventional mix (or blend)-spinning and a cross-sectional form peculiarity quite different from that of the desirable fiber structure in which different kinds of components are dispersed with each other would be obtained.

Further, if the center distance H between the spinning orifices becomes smaller than the range defined by $H = PDT^{-1}$, the dispersion between the different kinds of fiber-forming components is not substantially recognized and there would occur very unstable spinning conditions in which the different kinds of fiber-forming components are simply arranged as in usual composite fiber or only a single fiber forming component is delivered through one spinning orifice.

In working the method of the present invention, if two or more kinds of fiber-forming components different in the dyeability, tenacity and elongation, or shrinkability are selected and are spun through a dispersion region having dimensional characteristics defined by the formula (1), there are formed multi-laminated fibers having a peculiar structure in which these different kinds of fiber-forming components are dispersed in the fiber cross-section and along the axial direction of the fiber. For example, if two kinds of fiber-forming components different in the dyeability are selected and the degree of the dispersion of these components is adjusted, it is possible to obtain a multi-laminated fiber in which components different in the dyeability are dispersed in a single filament cross-section as illustrated in A to D of FIG. 4 and the dyeability is controlled so as to make a melange tone or pastel tone. As another exemplification, if fiber forming components different in the thermoshrinkability are spun in a range in which the length characteristic value $PDT^{-1}$ of the dispersion is selected to be comparatively large, there can be made a multi-laminated fiber which has a crimp developability close to that of a conventional composite fiber and in which the degree of the crimp development is irregularly varied along the axial direction of the fiber.

The fiber-forming components that can be used in the present invention are high molecular weight substances having a fiber forming property such as polyacrylonitriles and their copolymers, polyamides and their copolymers, polyethylene terephthalates and their copolymers, polyvinyl chlorides, polycarbonates, polyolefins and viscose. Any combination of them can be also used.

Examples of the present invention are illustrated in the following but the present invention is not limited thereto. In the examples, the parts and percentages are by weight unless otherwise specified.

EXAMPLE 1

As an acid dye dyeable copolymer, there was prepared a copolymer A consisting of 80 percent acrylonitrile, 13 percent vinyl acetate and 7 percent 2-methyl-5-vinyl pyridine, and as a basic dye dyeable copolymer there was prepared a copolymer B consisting of 90 percent acrylonitrile, 9.5 percent methyl acrylate and 0.5 percent sodium methallylsulfonate. Two kinds of spinning solutions were prepared by separately dissolving 10 parts of each of the two kinds of copolymers A and B in 90 parts of 50 percent aqueous solution of sodium thiocyanate. Their equal amounts were fed to the apparatus as shown in FIGS. 2 and 3 provided with two metering pumps (not shown) and were extruded therethrough into 10 percent aqueous solution of sodium thiocyanate kept at 0°C. by varying the length characteristic values of the dispersion region as shown in the below indicated Table 1. The obtained filament was washed with water, then drawn 8 times the original length in boiling water, dried in high temperature air at a dry-bulb temperature of 105°C. and a wet-bulb temperature of 70°C. until the water content in the fiber became 3 percent. Then the filament was heat-relaxed in a saturated steam at 120°C. for 10 minutes and was dried at 80°C. for 20 minutes. The thus obtained multi-laminar fiber was dipped in a dyeing solution of 20 percent o.w.f. Sevlon Blue 5G (a basic dye produced by DuPont Co.) and 1 percent o.w.f. acetic acid at a bath ratio of 1:100 and was boiled for 90 minutes to be dyed.

TABLE 1

| Dispersing aid: | Typical dimension (D) |
|---|---|
| Fine particles of stainless steel | 2.0 mm. |
| Center distance (P) between independent flow passages | 1.2 mm. |
| Center distance (H) between spinning orifices | 0.6 mm. |
| Thickness (T) of the dispersing region | 4.0 mm. |
| $H.T.P^{-1}.D^{-1}$ 1 | |

The multi-laminated fiber obtained with this spinning device was comparatively low in the degree of mutual dispersion of the fiber-forming components but showed a peculiar arrangement of the fiber-forming components in which the components different in the dyeability were intermittently dispersed along the axial direction of the fiber as shown in A of FIG. 4 and which is not seen in an ordinary composite fiber.

EXAMPLE 2

The same procedure as in Example 1 was repeated except that the length characteristic value of the dispersion region was as mentioned in Table 2.

TABLE 2

| Dispersing aid: | Typical dimension (D) |
|---|---|
| MacMahon packing of a fine metal wire diameter of 0.2 mm. | 0.6 mm. |
| Center distance (P) between independent flow passages | 1.2 mm. |
| Center distance (H) between spinning orifices | 0.6 mm. |
| Thickness (T) of the dispersing region | 20.0 mm. |
| $H.T.P^{-1}.D^{-1}$ 16.7 | |

The multi-laminated fiber thus obtained was higher in the degree of mutual dispersion of the fiber-forming components than the fiber obtained in Example 1 and showed such fiber structure as is exemplified in B of FIG. 4.

EXAMPLE 3

The same procedure as in Example 1 was repeated except that the length characteristic value of the dispersion region in the spinning device was as in the following Table 3.

TABLE 3

| Dispersing aid: | Typical dimension (D) |
|---|---|
| Dickson packing of a fine metal wire diameter of 0.3 mm. | 0.9 mm. |
| Center distance (P) between independent flow passages | 0.6 mm. |
| Cebter dustabce (H) between spinning orifices | 0.6 mm. |
| Thickness (T) of the dispersing region | 25.0 mm. |
| $H.T.P^{-1}.D^{-1} = 27.8$ | |

The resulting multi-laminated fiber had an arrangement of different fiber-forming component flows repeated at least three times in a length corresponding to the diameter of the fiber and had a fiber structure in which these fiber forming components were discontinuously dispersed along the axial direction of the fiber as exemplified in C of FIG. 4.

EXAMPLE 4

The same procedure as in Example 1 was repeated except that the length characteristic value of the dispersion region in the spinning device was as shown in the following Table 4.

TABLE 4

| Dispersing aid: | Typical dimension (D) |
|---|---|
| Dickson packing of a fine metal wire diameter of 0.2 mm. | 0.6 mm. |
| Center distance (P) between independent flow passages | 0.6 mm. |
| Center distance (H) between spinning orifices | 1.5 mm. |
| Thickness (T) of the dispersing region | 30.0 mm. |
| $H.T.P^{-1}.D^{-1} = 125$ | |

The multi-laminated fiber thus obtained was remarkably fine in the dispersion of the different kinds of fiber-forming components in the cross-section and along the axial direction of the fiber and gave a pastel tone.

It will be understood from the above description and these examples that the object of irregularly dispersing such fiber properties as the dyeability, crimpability, tenacity and elongation in a single fiber filament can be easily attained by varying the length characteristics of the dispersion region in the spinning device within the range recommended in the present invention.

What we claim is:

1. A process for producing multi-laminated fibers which comprises flowing down at least two different kinds of fiber-forming components selected from the group consisting of acrylic polymers and copolymers in the form of laminar flows through independent flow passages alternately arranged and isolated from each other and then leading them to spinning orifices through a dispersion region filled with a dispersion aid, provided below the above mentioned independent flow passages and having dimensional characteristics defined by the formula $PDT^{-1} \leq H \leq 125 PDT^{-1}$ wherein $P$ is the center distance in mm. between adjacent independent flow passages through which different kinds of fiber-forming components are made to flow down in the form of laminar flows, $D$ is the typical dimension in mm. of the dispersion aid, $T$ is the thickness in mm. along the fiber spinning direction of the dispersion region and $H$ is the center distance in mm. between adjacent spinning orifices.

2. A process as claimed in claim 1 wherein H is equal to or greater than about 300 microns.

3. A process as claimed in claim 1 wherein one of the fiber-forming components is an acrylonitrile copolymer dyeable with an acidic dye while the other is an acrylonitrile copolymer dyeable with a basic dye.

4. An apparatus for producing multi-laminated fibers comprising independent flow passages through which at least two different kinds of acrylic polymers and copolymers are made to flow down in the form of laminar flows alternately arranged and isolated from each other, a dispersing region filled with a dispersion aid, provided below the said independent flow passages, and a spinnerette provided below the dispersion region, said apparatus having dimensional characteristics defined by the formula $PDT^{-1} \leq H \leq 125 PDT^{-1}$ wherein $P$ is the center distance in mm. between adjacent independent flow passages through which different kinds of fiber-forming components are made to flow down in the form of laminar flows, $D$ is the typical dimension in mm. of the dispersion aid, $T$ is the thickness in mm. along the fiber spinning direction of the dispersion region and $H$ is the center distance in mm. between adjacent spinning orifices in the spinnerette.

5. An apparatus as claimed in claim 4 wherein $H$ is equal to, or greater than about 300 microns.

6. An apparatus as claimed in claim 4 wherein the dispersion aid is fine grains or particles of a stainless steel.

7. An apparatus as claimed in claim 4 wherein the dispersion aid is MacMahon packing.

8. An apparatus as claimed in claim 4 wherein the dispersion aid is Dickson packing.

* * * * *